(12) United States Patent
Peri

(10) Patent No.: US 10,523,918 B2
(45) Date of Patent: Dec. 31, 2019

(54) SYSTEM AND METHOD FOR DEPTH MAP

(71) Applicant: Samsung Electronics Co., Ltd, Suwon-si (KR)

(72) Inventor: Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 15/830,832

(22) Filed: Dec. 4, 2017

(65) Prior Publication Data
US 2018/0278918 A1 Sep. 27, 2018

Related U.S. Application Data

(60) Provisional application No. 62/476,366, filed on Mar. 24, 2017.

(51) Int. Cl.
| | |
|---|---|
| *H04N 13/271* | (2018.01) |
| *H04N 5/232* | (2006.01) |
| *H04N 5/247* | (2006.01) |
| *H04N 13/106* | (2018.01) |
| *H04N 13/296* | (2018.01) |
| *H04N 13/239* | (2018.01) |

(52) U.S. Cl.
CPC ....... *H04N 13/271* (2018.05); *H04N 5/23238* (2013.01); *H04N 5/247* (2013.01); *H04N 13/106* (2018.05); *H04N 13/239* (2018.05); *H04N 13/296* (2018.05)

(58) Field of Classification Search
USPC ......................................................... 348/38
See application file for complete search history.

(56) References Cited

U.S. PATENT DOCUMENTS

| | | |
|---|---|---|
| 6,023,588 A | 2/2000 | Ray et al. |
| 7,126,630 B1 | 10/2006 | Lee et al. |
| 8,810,632 B2 | 8/2014 | Hwang et al. |
| 8,890,938 B2 | 11/2014 | Jin |

(Continued)

FOREIGN PATENT DOCUMENTS

| | | |
|---|---|---|
| CN | 106247951 A | 12/2016 |
| JP | 2010239416 A | 10/2010 |

(Continued)

OTHER PUBLICATIONS

ISA/KR, "International Search Report and Written Opinion of the International Searching Authority," International Application No. PCT/KR2018/003252, dated Jul. 12, 2018, 11 pages.

(Continued)

*Primary Examiner* — Behrooz M Senfi

(57) ABSTRACT

A method, electronic device, and non-transitory computer readable medium for transmitting information is provided. The method includes receiving, from each of two 360-degree cameras, image data. The method also includes synchronizing the received image data from each of the two cameras. Additionally, the method includes creating a depth map from the received the image data based in part on a distance between the two cameras. The method also includes generating multi-dimensional content by combining the created depth map with the synchronized image data of at least one of the two cameras.

20 Claims, 8 Drawing Sheets

(56) References Cited

U.S. PATENT DOCUMENTS

| | | | |
|---|---|---|---|
| 9,042,709 B2 | 5/2015 | Morioka et al. | |
| 9,153,066 B2 | 10/2015 | Ishii | |
| 9,270,976 B2 | 2/2016 | Houvener et al. | |
| 9,571,819 B1* | 2/2017 | Barron | H04N 13/128 |
| 2011/0050944 A1 | 3/2011 | Nakamura et al. | |
| 2011/0229012 A1* | 9/2011 | Singhal | G06K 9/00201 |
| | | | 382/154 |
| 2013/0057655 A1* | 3/2013 | Su | G02B 7/30 |
| | | | 348/47 |
| 2013/0250040 A1* | 9/2013 | Vitsnudel | H04N 5/23238 |
| | | | 348/36 |
| 2014/0368712 A1 | 12/2014 | Park et al. | |
| 2015/0181197 A1 | 6/2015 | Baldwin | |
| 2015/0269737 A1* | 9/2015 | Lam | H04N 13/128 |
| | | | 382/154 |
| 2015/0294474 A1* | 10/2015 | Grandin | H04N 13/264 |
| | | | 348/50 |
| 2015/0302651 A1 | 10/2015 | Shpigelman | |
| 2015/0341557 A1 | 11/2015 | Chapdelaine-Couture et al. | |
| 2016/0140731 A1 | 5/2016 | Lee et al. | |
| 2016/0212409 A1* | 7/2016 | Cole | H04N 13/0022 |
| 2016/0323565 A1* | 11/2016 | van Baarsen | G06T 7/593 |
| 2017/0078646 A1 | 3/2017 | Matsunobu et al. | |
| 2017/0142312 A1* | 5/2017 | Dal Mutto | H04N 5/332 |
| 2018/0278916 A1* | 9/2018 | Kim | G06T 7/596 |
| 2018/0359427 A1* | 12/2018 | Choi | H04N 21/21805 |

FOREIGN PATENT DOCUMENTS

| | | |
|---|---|---|
| JP | 2010258669 A | 11/2010 |
| KR | 10-2013-0083547 A | 7/2013 |
| KR | 10-2017-0017700 A | 2/2017 |
| WO | 2017-026705 A1 | 2/2017 |

OTHER PUBLICATIONS

ISA/KR, "International Search Report and Written Opinion of the International Searching Authority," International Application No. PCT/KR2018/002752, dated Aug. 21, 2018, 14 pages.

Benosman, Ryad et al., "Event-Based Visual Flow," IEEE Transactions on Neural Networks, Nov. 2013 (https://www.researchgate.net/publication/258355234_Event-Based Visual_Flow), 19 pages.

Censi, A. et al., "Low-latency event-based visual odometry," 2014 IEEE International Cnference on Robotics and Automation(ICRA), Hong Kong, pp. 703-710, 2014(https://ieeexplore.ieee.org/document/6906931/), 12 pages.

Weikersdorfer, David et al., "Event-based particle filtering for robot self-localization," Conference: IEEE International Conference on Robotics and Biomimetics, Dec. 2012, (https://www.researchgate.net/publication/259006160_Eventbased_particle_filtering_for_robot_self-localization), 7 pages.

"2D-plus-depth", Wikipedia, the free encyclopedia, dated Feb. 3, 2017, 3 pages. https://en.wikipedia.org/wiki/2D-plus-depth.

"Computer stereo vision", Wikipedia, the free encyclopedia, dated Nov. 22, 2016, 6 pages. https://en.wikipedia.org/wiki/Computer_stereo_vision.

Vaka, "The 2.5D Effect: How to Animate Photos and Create a Parallax Shift", ScribbleLive, Inc., May 7, 2014, 6 pages. http://www.scribblelive.com/blog/2014/05/07/the-2-5d-effect-how-to-animate-photos-and-create-a-parallax-shift/.

* cited by examiner

SYSTEM AND METHOD FOR DEPTH MAP

CROSS-REFERENCE TO RELATED APPLICATION AND CLAIM OF PRIORITY

This application claims priority under 35 U.S.C. § 119(e) to U.S. Provisional Patent Application No. 62/476,366, filed on Mar. 24, 2017. The above-identified provisional patent application is hereby incorporated by reference in its entirety.

TECHNICAL FIELD

This disclosure relates generally to image processing. More specifically, this disclosure relates to generating multi-dimensional content of a 360-degree omnidirectional image.

BACKGROUND

For over a century cameras have captured human experiences. Cameras allow a user to capture and record images and videos. By recording an event a camera allows the user to preserve memories, and share their experiences with others. Photographic technologies associated with cameras have continually evolved from a silver plated sheet of copper to film to a modern day digital camera. As technology continues to continually evolve, 360-degree cameras are becoming more widespread, as they allow a user to capture an image or video of a 360-degree scene. Therefore there is a growing number of viewing devices which allow a user to view the 360-degree scene similar to a virtual environment.

SUMMARY

Embodiments of the present disclosure provide systems and methods to create a depth map from a 360 stereo camera.

In one embodiment, a method for to create depth map from 360 stereo cameras is provided. The method includes receiving, from each of two 360-degree cameras, image data. The method also includes synchronizing the received image data from each of the two cameras. Additionally, the method includes creating a depth map from the received the image data based in part on a distance between the two cameras. The method also includes generating multi-dimensional content by combining the created depth map with the synchronized image data of at least one of the two cameras.

In another embodiment, an electronic device is provided. The electronic device includes at least one processor. The at least one processor is coupled to a communication interface and configured to receive from each of two 360-degree cameras, image data. The least one processor is also configured to synchronize the received image data from each of the two cameras. The at least one processor is also configured to create a depth map from the received the image data based in part on a distance between the two cameras. The at least one processor is also configured to generate multi-dimensional content by combining the created depth map with the synchronized image data of at least one of the two cameras.

In yet another embodiment a non-transitory computer readable medium embodying a computer program is provided. The computer program comprising program code that when executed causes at least one processor to receive from each of two 360-degree cameras, image data; synchronize the received image data from each of the two cameras; create a depth map from the received the image data based in part on a distance between the two cameras; and generate multi-dimensional content by combining the created depth map with the synchronized image data of at least one of the two cameras.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
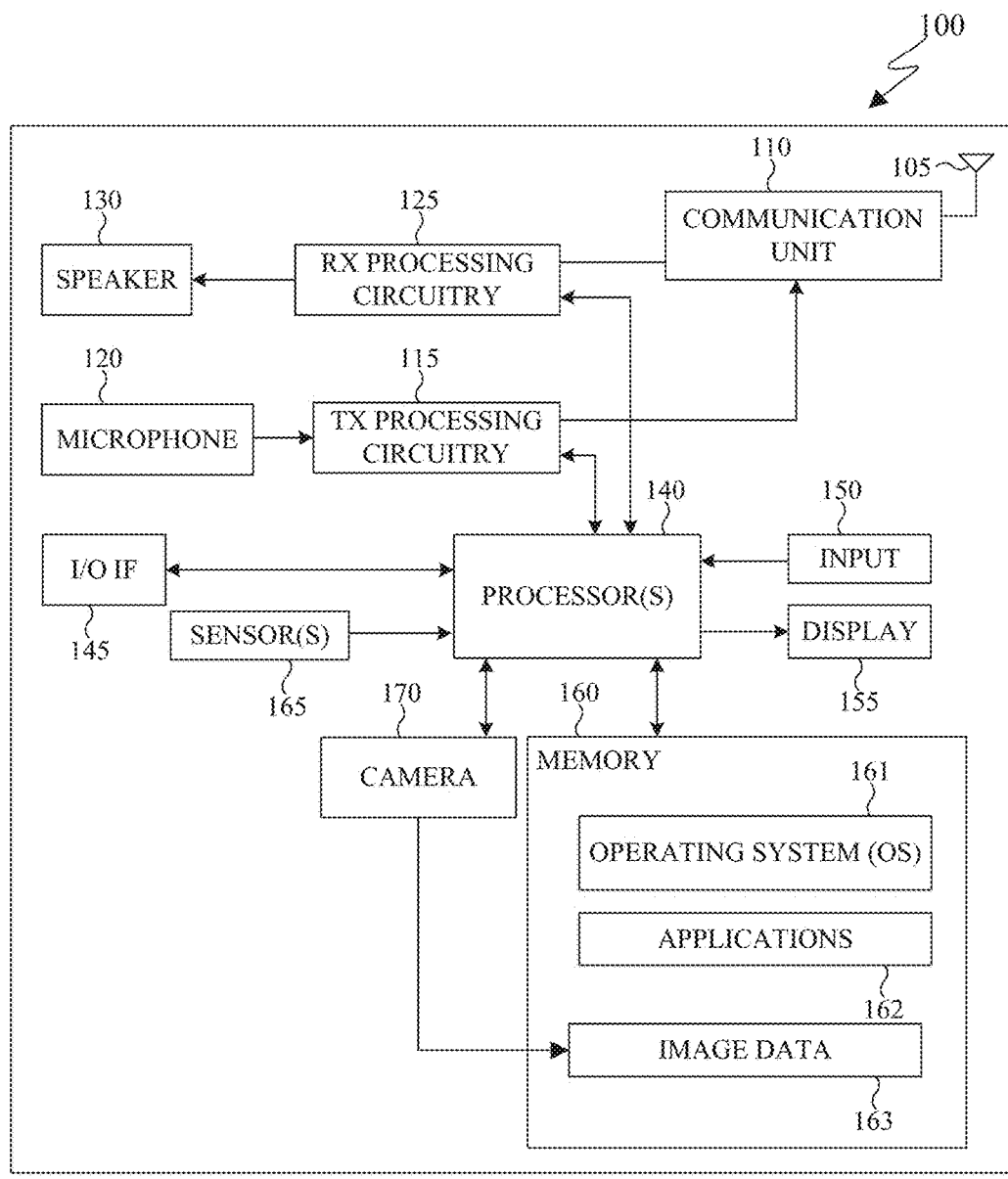
FIG. 1 illustrates an example electronic device in accordance with an embodiment of this disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of the present disclosure recognize that 360-degree cameras are part of a family of devices which can record images or video (content). A 360-degree camera can capture every angle of an entire scene in one 360-degree image. A 360-degree camera may capture an image of 360-degrees along a horizontal x-axis. A 360-degree camera may capture an image of 360-degrees along a vertical y-axis. For example, a 360-degree camera may have a field of view able to capture and record a 360-degree scene along a horizontal plane and/or a vertical plane. A 360-degree camera may be referred to as an omnidirectional camera as the camera covers all viewpoints simultaneously. Generally, 360-degree cameras are capable of capturing and recording an image extending from a focal point of the camera.

Embodiments of the present disclosure further recognize and take into consideration that 360-degree cameras are often used in virtual reality or virtual reality photography, by capturing a 360-degree scene as a single image. Such image can be replayed using a virtual reality headset. An example of a virtual reality headset may include a stereoscopic device that provides a user with a complete image of the captured scene objects. Stereoscopy refers to a technique for creating the illusion of depth in an image.

Embodiments of the present disclosure combines two images (stereo photography), in order to perceive a two dimensional image in three dimensions by adding an element of depth. Each camera views a slightly different angle of a subject, which adds the element of depth and distance. Similarly, embodiments of the present disclosure recognize that capturing 360-degree image(s) from different viewpoints and combining them adds an element of depth to the recorded 360-degree image. Such depth may be referred to as a 2.5-dimensional image, as it is not a true 3-dimensional image.

Embodiments of the present disclosure further recognize and take into consideration that the generation of 2.5-dimensional images of a 360-degree scene as used herein are not limited to a personal use (in a residence or of a an outdoor setting), rather such devices may be incorporated and used in a variety of locations, such as in a virtual and augmented reality headsets, gaming systems, as well as a variety of industries such as education, automotive, telecommunications, retail, healthcare, television broadcasting, commercial video production, and the like.

Therefore, embodiments of the present disclosure recognize and take into consideration that it may be useful to provide an aspect of depth to a 360-degree omnidirectional image. Embodiments of the present disclosure provide numerous advantages by providing a sense of three-dimensional viewing on a two-dimensional display. Additionally, embodiments of the present disclosure also provide for adjusting the image in response to a user's movement providing a further sense of depth to the image.

FIG. 1 illustrates an example device in a computing system in accordance with an embodiment of this disclosure. The embodiment of the electronic device 100 illustrated in FIG. 1 is for illustration only, the electronic device 100 may come in a wide variety of configurations, and FIG. 1 does not limit the scope of this disclosure to any implementation of an electronic device. For example, the electronic device 100 may be a mobile communication device, such as a mobile station, head mountable display, a subscriber station, a wireless terminal, a mobile telephone or mobile devices (i.e., smartphone), mobile device, a personal digital assistant (PDA), a laptop computer, a tablet, desktop computer, a camera, etc., that is useable with data transfer applications, such as capturing and processing content.

Electronic device 100 can communicate directly or indirectly with a network. For example, electronic device 100 may communicate via one or more base stations, such as cellular base stations or eNodeBs. For another example, electronic device 100 communicates via one or more wireless access points, such as IEEE 802.11 wireless access points. In communicating over a network, electronic device 100 may communicate via Internet Protocol (IP) packets, frame relay frames, Asynchronous Transfer Mode (ATM) cells, or other information type between network addresses. The network may include one or more local area networks (LANs), metropolitan area networks (MANs), wide area networks (WANs), all or a portion of a global network such as the Internet, or any other communication system or systems at one or more locations. Electronic device 100 can communicate directly with additional electronic devices (not shown in FIG. 1).

Figure 3:
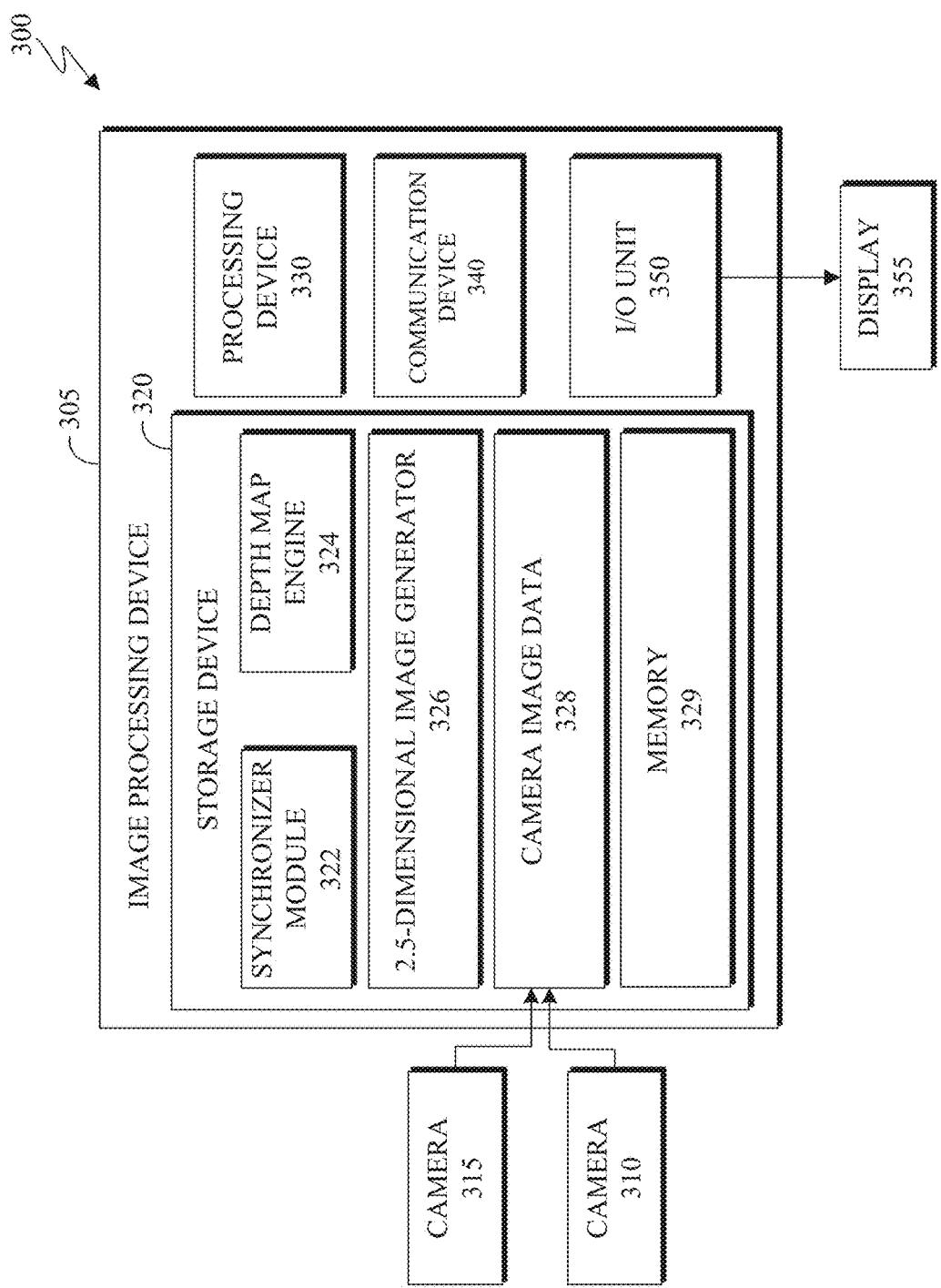
FIG. 3 illustrates an example block diagram in accordance with an embodiment of this disclosure.

As shown in FIG. 1, the electronic device 100 includes an antenna 3105, a communication unit 110, transmit (TX) processing circuitry 115, a microphone 120, and receive (RX) processing circuitry 125. The communication unit 110 may include, for example, a RF transceiver, a Bluetooth transceiver, or a Wi-Fi transceiver, and the like. The electronic device 100 also includes a speaker 130, a processor 140, an input/output (I/O) interface (IF) 145, an input 150, a display 155, a memory 160, sensor(s) 165, and camera 170. The memory 160 includes an operating system (OS) 161 one or more applications 162, and image data 163. communication unit 110 can include additional communication interfaces, such as Bluetooth, ZIGBEE, infrared, etc. In another example, the communication unit 110 may be similar to communications device 340 (as shown in FIG. 3) and may support wired communications, for example, via a network interface card.

The communication unit 110 receives, from the antenna 105, an incoming RF signal such as a Bluetooth® or Wi-Fi® signal from an access point (e.g., base station, Wi-Fi router, BLUETOOTH device) of a network (e.g., a Wi-Fi, Bluetooth, cellular, 5G, LTE, LTE-A, WiMAX, or any other type of wireless network). The communication unit 110 may down-convert the incoming RF signal to generate an intermediate frequency or baseband signal. The intermediate frequency or baseband signal is sent to the RX processing circuitry 125, which generates a processed baseband signal by filtering, decoding, and/or digitizing the baseband or intermediate frequency signal. The RX processing circuitry 125 transmits the processed baseband signal to the speaker 130 (such as for voice data) or to the processor 140 for further processing (such as for web browsing data and/or image processing).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or intermediate frequency signal. The communication unit 110 receives the outgoing processed baseband or intermediate frequency signal from the TX processing circuitry 115 and up-converts the baseband or intermediate frequency signal to an RF signal that is transmitted via the antenna 3105.

The processor 140 can include one or more processors or other processing devices and execute the OS 161 stored in the memory 160 to control the overall operation of the electronic device 100. For example, the processor 140 could control the reception of forward channel signals and the transmission of reverse channel signals by the communication unit 110, the RX processing circuitry 125, and the TX processing circuitry 115 in accordance with well-known principles. The processor 140 is also capable of controlling camera 170 to focus on the scene and capture/record the content by digitizing it through one or more sensors on camera 170. The processor 140 is also capable of executing other applications 162 resident in the memory 160, such as, one or more applications for image processing and creating a 2.5-dimensional image from two or more 360-degree cameras, as discussed in more detail below. The processor 140 is also capable of executing other applications 162 resident in the memory 360 to manipulate and edit image data 163. In some embodiments, the processor 140 includes at least one microprocessor or microcontroller.

The processor 140 is also capable of executing other processes and programs resident in the memory 360, such as operations that receive, store, and timely instruct by providing image capturing and processing. The processor 140 can move data into or out of the memory 160 as required by an executing process. In some embodiments, the processor 140 is configured to execute a plurality of applications 162 based on the OS 161 or in response to signals received from eNBs or an operator. In some embodiments, the processor 140 is configured to execute a plurality of applications 162 based on for image processing for electronic device 100. In some embodiments, the processor 140 is configured to import and export data received from camera 170.

The processor 140 is also coupled to the input 150 and the display 155. The operator of the electronic device 100 can use the input 150 to enter data and/or inputs into the electronic device 100. Input 150 may be a keyboard, touch screen, mouse, track ball or other device capable of acting as a user interface to allow a user in interact with electronic device 100. For example, the input 150 can include a touch panel, a (digital) pen sensor, a key, or an ultrasonic input device. Input 150 may be associated with sensor(s) 165 and/or camera 170 by providing additional input to processor 140. As discussed in greater detail below, sensor 165 may include, for example, inertial sensors (e.g., accelerometers, gyroscope, and magnetometer), optical sensors, motion sensors, cameras, pressure sensors, heart rate sensors, altimeter, breath sensors (e.g., microphone 120), etc. As discussed in greater detail below, camera 170 may be any type or configuration of a camera able to capture and record images and video. The touch panel can recognize, for example, a touch input in at least one scheme among a capacitive scheme, a pressure sensitive scheme, an infrared scheme, or an ultrasonic scheme. The input 150 can also include a control circuit. In the capacitive scheme, the input 150 can recognize touch or proximity. The display 155 may be a liquid crystal display, light-emitting diode (LED) display, optical LED (OLED), active matrix OLED (AMOLED), or other display capable of rendering text and/or graphics, such as from websites, videos, games and images, etc.

The memory 160 is coupled to the processor 140. Part of the memory 160 could include a random-access memory (RAM), and another part of the memory 160 could include a Flash memory or other read-only memory (ROM). Image data 163 of memory 160 is a repository for storing image data received from camera 170.

Electronic device 100 further includes one or more sensor(s) 165 that can meter a physical quantity or detect an activation state of the electronic device 100 and convert metered or detected information into an electrical signal. For example, sensor(s) 165 may include one or more buttons for touch input, e.g., on the headset or the electronic device 100, a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. The sensor(s) 165 can be used to determine an orientation and facing direction, as well as geographic location of the electronic device 100. Any of these sensor(s) 165 may be located within the electronic device 100, within a headset configured to hold the electronic device 100, or in both the headset and electronic device 100, for example, in embodiments where the electronic device 100 includes a headset.

Electronic device 100 further includes one or more cameras 170 that can capture and record images and/or video content. Camera 170 may be 360-degree camera capable of capturing a 360-degree scene. For example, camera 170 may have two lenses each lenses capable of recording 180 degrees (i.e., a fish-eye lens) and processor 140 is capable merging the two images into one seamless image that can be viewed on a display a such as a computer screen, a smart phone, mobile phone a head mounted display, a stereoscopic display, and the like. For another example, camera 170 may have many lenses each angled to capture a 360-degree view. In another example, camera 170 may have a single lens capable of recording a single 360-degree image of an entire scene. Camera 170 may transmit information securely and efficiently to another device, such as, for example, image processing device 305. Camera 170 may transmit data, such as image data, video data, a time stamp associated with the image and video data, and/or geographic information, image processing device 305. For example, cameras 170 may capture and record image data and transmit the data to the image processing device 305 to generate a 2.5-dimensional image from two cameras. Details of generating the 2.5-dimensional image from the two cameras will be discussed in more details below.

Although FIG. 1 illustrates one example of electronic device 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the electronic device 100 configured as a mobile telephone, tablet, smartphone, a wireless capable 360-degree camera, or the electronic device 100 could be configured to operate as other types of mobile or stationary devices.

As described in more detail below, the electronic device 100 can be one example of any device for the use of selecting a method for transferring data. The electronic device 100 can be used to remotely access information, on a server, about the communication methods of another device. Additionally, the electronic device 100 can be used to capture an image and/or process an image to create a 2.5-dimension image of a 360-degree scene.

Figure 2:
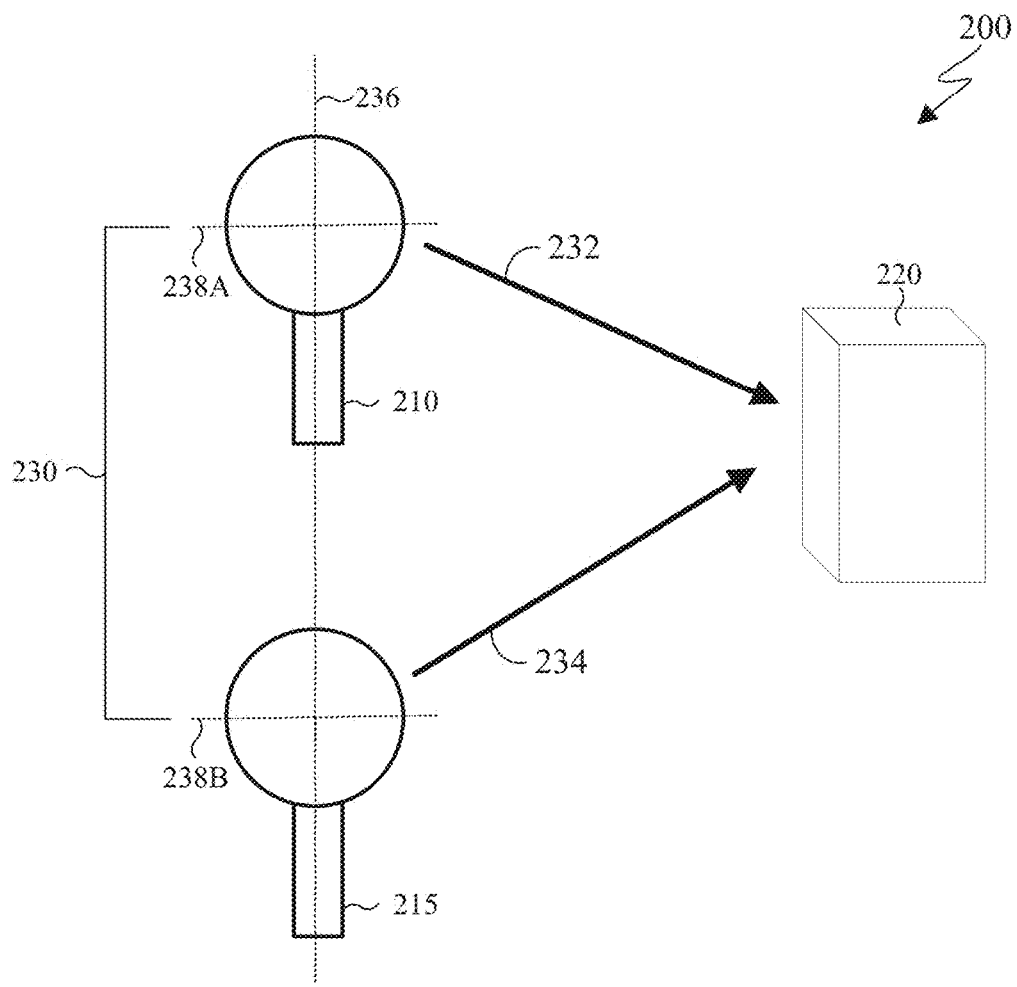
FIG. 2 illustrates an example vertical configuration of two 360-degree cameras in accordance with an embodiment of this disclosure.

FIG. 2 illustrates an example block diagram in accordance with an embodiment of this disclosure. The block diagram therewith is for illustration only, and does not limit the scope of this disclosure to any particular implementation.

In this exemplary embodiment, environment 200 includes cameras 210 and 215 (each similar to 360-degree camera 170 of FIG. 1) and an object 220. Cameras 210 and 215 may be interconnected over a network (not shown), or standalone devices.

Camera 210 and camera 215 may include internal and external components as previously depicted and described in further detail with respect to electronic device 100 of FIG. 1. Environment 200 illustrates an exemplary setup of two 360-degree cameras, 210 and 215, that can capture a 360-degree image of a scene, which includes object 220. As depicted in environment 200, in one embodiment, camera 210 is positioned above camera 215, along a vertical (center) axis 236. In alternative embodiments, camera 210 and camera 215 may be positioned in any other configuration. Environment 200 is not limited to two cameras and may include additional cameras. Camera 210 and camera 215 can capture and record still images and/or video of moving objects. As discussed below, when a still image is discussed those skilled in the art will appreciate that a video may alternatively be utilized, and vice versa.

Figure 4A:
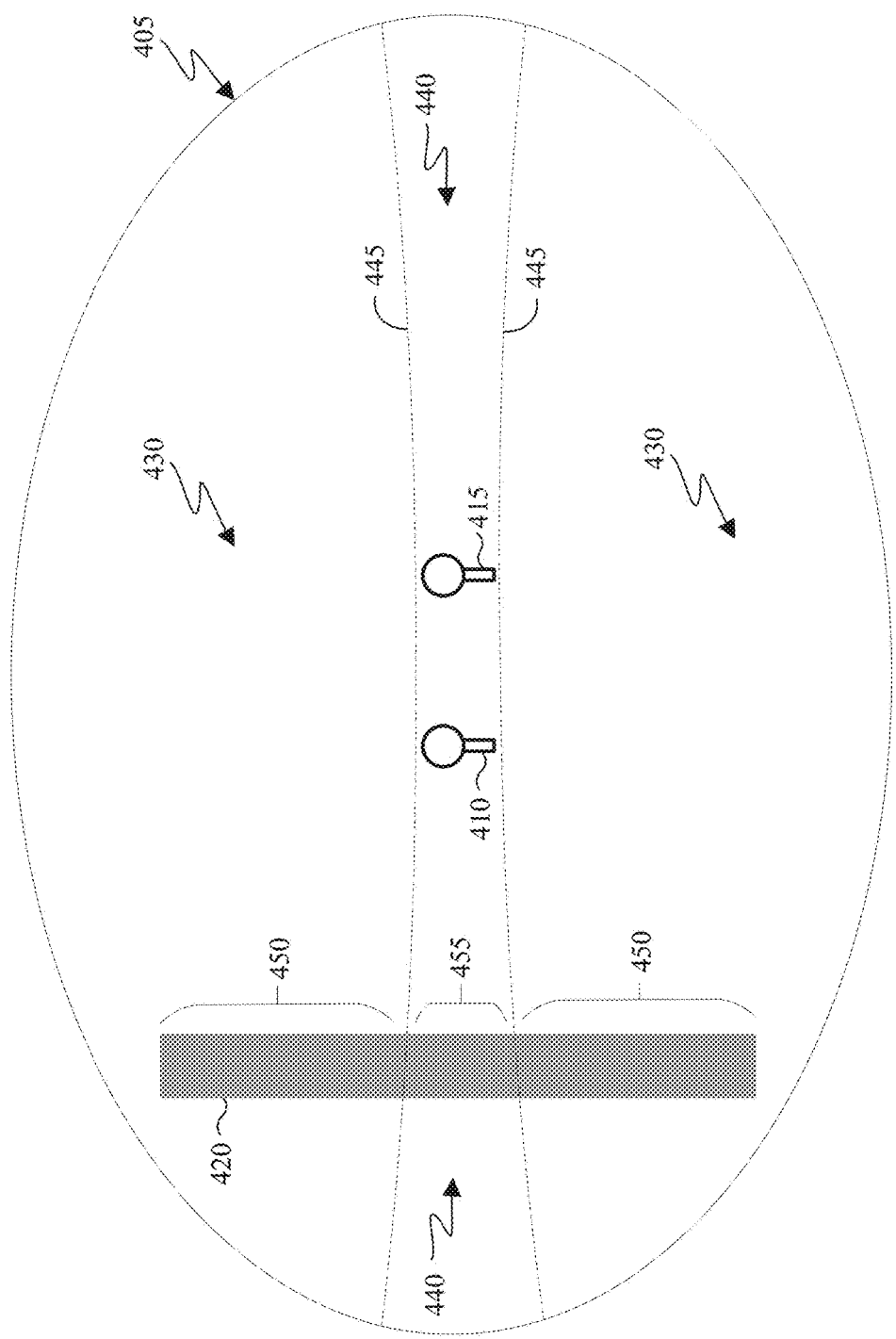
FIGS. 4A, 4B and 4C illustrate an example horizontal configuration of two 360-degree cameras in accordance with an embodiment of this disclosure.
Figure 4B:
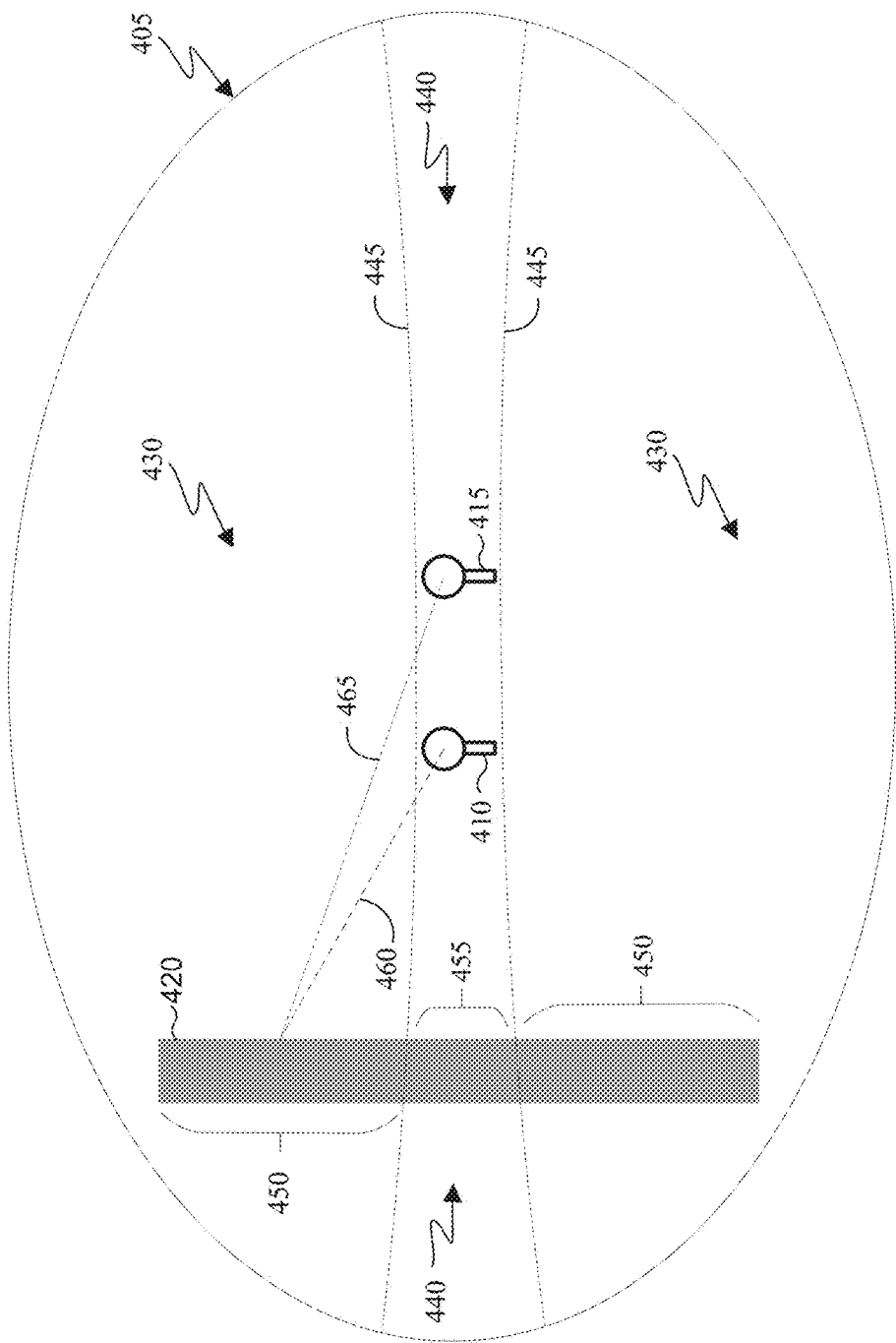
Figure 4C:
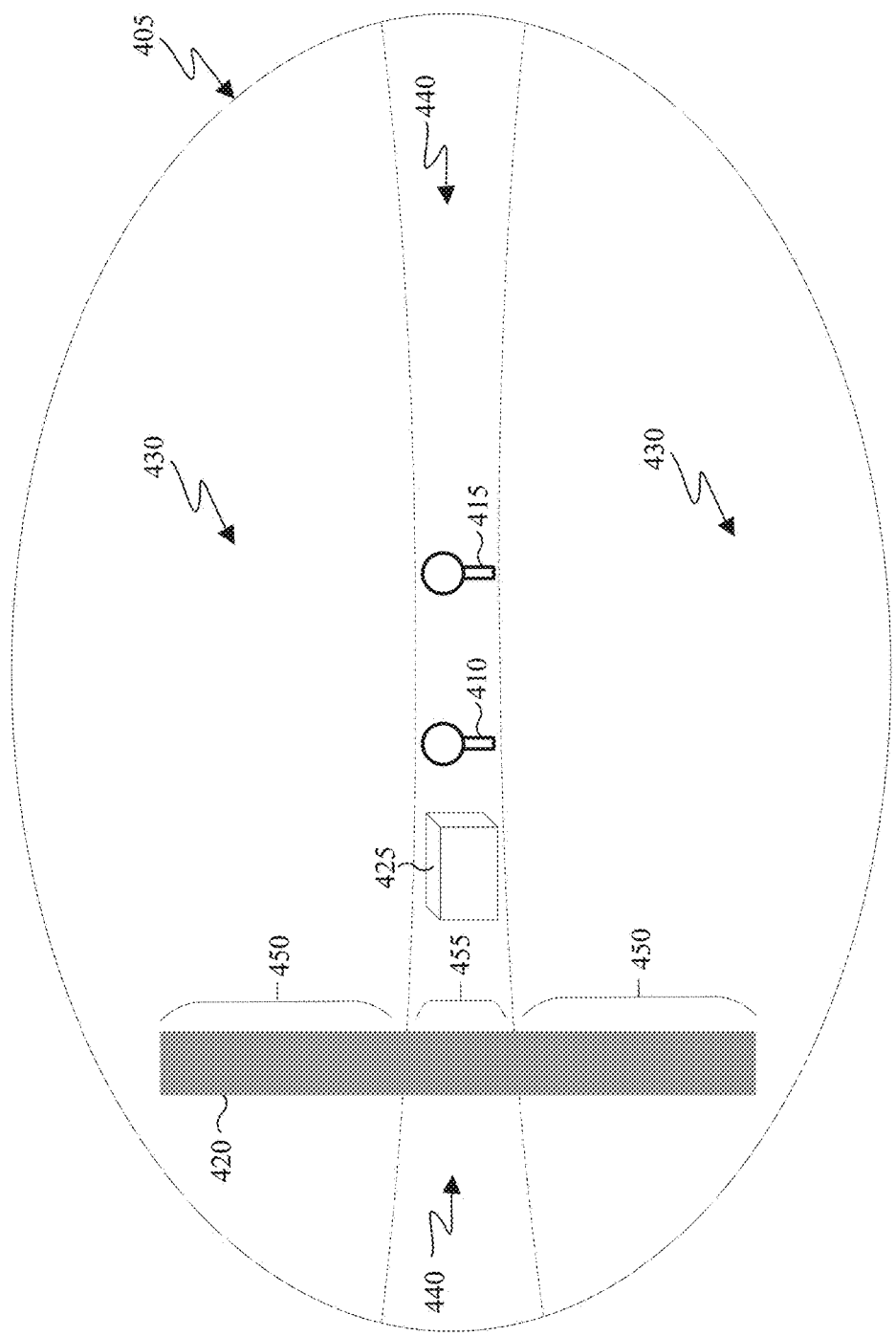

Each of cameras 210 and 215 provide a variety of functions similar to that of an omnidirectional camera capable of capturing a 360-degree view, and capture a 360-degree view along the horizontal or vertical axis. For example, placing the cameras on top of one another, as depicted in environment 200, does not occlude the other's image. If camera 210 and camera 215 are side by side, as depicted in FIGS. 4A, 4B, and 4C, occlusion may occur.

Embodiments of the present disclosure recognize and take into consideration that two 360-degree cameras may occlude each other when creating a stereo 360-degree image or movie. One or more embodiments of this disclosure provide generating a depth map to create a 2.5-dimensional 360-degree image or movie to minimize and/or eliminate any occlusion. Computer vision may be used to complete the image if occlusion occurs. Similarly, artificial intelligence and machine learning may also be utilized to complete the image if occlusion occurs, as described in more detail below.

Embodiments of the present disclosure recognize and take into consideration that 2.5-dimensional content provides an element of depth to an otherwise flat image. Although a 2.5-dimensional image is a not true 3-D image, the element of depth provides a sense of an additional dimension to the image. Generally, a 2.5-dimensional image provides depth but limited to a single point of view.

In one embodiment, camera 210 and camera 215 are identical 360-degree cameras. In other embodiments, camera 210 and camera 215 may not be identical. For example, camera 210 and camera 215 may have different resolution capabilities.

As depicted in FIG. 2, camera 210 is positioned above and camera 215 along vertical axis 236. Vertical axis 236 is positioned through the center point of each camera 210 and camera 215. Horizontal axis 238A and 238B depicts the horizontal center point axis of the two cameras.

Measurement 230 is the distance between the center points of camera 210 and camera 215. Measurement 230 illustrates a vertical displacement between camera 210 and camera 215, in relation to the center points of each camera. In one or more embodiments, measurement 230 may be similar to the interpupillary distance (IPD). IPD represents the distance between a human's eyes. For example, IPD is the distance between the centers of two pupils. In various embodiments, measurement 230 may be any recordable distance between the two cameras 210 and 215. Once measurement 230 is determined, electronic device 100 can derive locations of one or more objects (i.e., object 220) in 3-D space.

Object 220 may represent any object which cameras 210 and 215 view. Each camera 201 and 215 views an object at a slightly different perspective, which allows for conversion of the two images into a single image which provides an element of depth. For example, the measurement 230 between camera 210 and camera 215 may affect the depth perception of a 2.5-dimensional image. For example, the greater the displacement of measurement 230 between cameras 210 and 215, the greater range and depth perception of larger objects. In contrast, as the distance of measurement 230 between cameras 210 and 215 decreases, the smaller the range and depth perception of smaller objects (i.e., macro view).

Embodiments of the present disclosure recognize that the ability to perceive the physical environment allows one the understanding of relationships between objects and ourselves within an environment. By utilizing two cameras, the resulting images through image processing provide a sense of depth to the image and thereby provide understanding of special relationships between objects and ourselves within an environment.

As illustrated in FIG. 2, cameras 210 and 215 are aligned along both vertical axis and horizontal axis 236, 238A, and 238B, respectively. As discussed in more details below, alternative embodiments recognize that cameras 210 and 215 may not be aligned along one or both axis. Regardless of the cameras position relative to one another, the relative position of camera and the distance between each camera is known in order to create a 2.5-dimensional image of a 360-degree scene.

Embodiments of the present disclosure recognize and take into consideration that cameras 210 and 215 are capable of capturing 360-degree stereo image pairs displaced from each other of measurement 230 along the vertical axis. When camera 210 is located above camera 215 along the vertical axis 236, the points in each image of the stereo pair of cameras have a corresponding point in the other image along a vertical line. For example, when capturing the image of object 220, camera 210 and camera 215 both view object 220 along corresponding points of a vertical line. Each camera therefore views object 220 at a slightly different perspective, in relation to measurement 230. FIG. 2 only depicts a singular object, object 220, in certain embodiments (not shown) camera 210 and camera 215 can each capture a plurality of objects located within a 360 degrees view.

Camera 210 and camera 215 may be mechanically or electronically synced to capture an image simultaneously. For example, camera 210 and camera 215 may be in communication with a remote control (not depicted), that when activated, simultaneously notifies each camera to capture and record the scene. For example, camera 210 and camera 215 may be in communication with a network, through which a simultaneous notification is sent to each camera to capture and record the scene. Those skilled in the art will appreciate alternative methods and apparatuses to simultaneously capture a 360-degree image from two or more cameras. Alternative embodiments may utilize a synchronization module to synchronize the images captured after the images are recorded, discussed in more details below. If the scene is completely still, then synchronization may not be necessary (i.e., no objects in the scene are moving nor are there any movements with respect to either camera 210 or 215).

Embodiments of the present disclosure recognize that, by utilizing two cameras, each camera views object 220, from a slightly different angle, to provide an element of depth to a flat image. The angle each camera views object 220 is dependent on measurement 230. For instance, camera 210 views object 220 along line of sight 232. Similarly, camera 215 views object 220 along line of sight 234. The resulting images are offset slightly, that when converted into a single image through image processing, provides a sense of depth to the image and thereby provides understanding of special relationships between objects within the environment. Thereby, the resulting images produced through image processing provide a sense of depth to the image.

Environment 200 depicts only one object, object 220, however it is noted camera 210 and camera 215 each represent 360-degree cameras, and therefore additional objects (not shown) can be located anywhere within a 360-degree view.

Reference is now made to FIG. 3. FIG. 3 illustrates an example block diagram in accordance with an embodiment of this disclosure. System 300 as shown in FIG. 3 is for illustration only. Many modifications to the depicted system 300 may be made by those skilled in the art without departing from the scope of the disclosure. Other embodiments of the system 300 could be used without departing from the scope of the present disclosure. FIG. 3 depicts system 300 which portrays an image processing device 305 (similar to electronic device 100 of FIG. 1) which creates a 2.5-dimensional image from the 360-degree images received from camera 310 and camera 315 (similar to electronic device 100 of FIG. 1 and/or cameras 210 and 215 of FIG. 2). Cameras 310 and 315, image processing device 305, and/or display 355 may be interconnected over network, or may be standalone devices.

Camera 310 and camera 315 may be similar to camera 210 and 215 of FIG. 2. Camera 310 and camera 315 each represent a 360-degree camera which captures a 360-degree scene. Camera 310 and camera 315 are positioned a known displacement apart and are a known relative position from each other. For example, referring to FIG. 2, camera 310 and camera 315 are located above each other along vertical axis 236 and are a known measurement 230 apart from measured from their horizontal axis, 238A and 238B, respectively.

Image processing device 305 may include internal and external components as previously depicted and described in further detail in greater detail below. Image processing device 305 contains a storage device 320, a processing device 330, a communication device 340 and an I/O Unit 350. According to one aspect of the present disclosure, image processing device 305 is an image processing device for creating a 2.5-dimensional image of a 360-degree scene. According to one aspect of the present disclosure, image processing device 305 creates a 2.5-dimensional image of a 360-degree scene by generating a depth map utilizing a first image and a second image which were captured by different viewpoints from camera 310 and camera 315.

The processing device 330 executes instructions that may be loaded into a storage device 320. The processing device 330 may include any suitable number(s) and type(s) of processors or other devices in any suitable arrangement. Example types of processing devices 330 include microprocessors, microcontrollers, digital signal processors, field programmable gate arrays, application specific integrated circuits, and discreet circuitry.

The synchronizer module 322, depth map engine 324, 2.5 dimensional image generator 326, camera image data 328, and memory 329, are examples of storage devices 320, which represent any structure(s) capable of storing and facilitating retrieval of information (such as data, program code, and/or other suitable information on a temporary or permanent basis). Synchronizer module 322, depth map engine 324, 2.5 dimensional image generator 326 are all discussed in greater detail below. Camera image data may represent an information repository which receives image data from camera 310 and 315. Camera image data 328 may transmit received image data to synchronizer module 322. The memory 329 may represent a random access memory or any other suitable volatile or non-volatile storage device(s). Memory 329 may also contain one or more components or devices supporting longer-term storage of data, such as a ready only memory, hard drive, flash memory, or optical disc.

The communications device 340 supports communications with other systems or devices. For example, the communications device 340 could include a network interface card or a wireless transceiver facilitating communications over a network. The communications device 340 may support communications through any suitable physical or wireless communication link(s). The communications device 340 may include only one or both of a transmitter and receiver.

The I/O unit 350 allows for input and output of data. For example, the I/O unit 350 may provide a connection for user input through a keyboard, mouse, keypad, touchscreen, or other suitable input device. The I/O unit 350 may also send output to display 355, printer, or other suitable output device.

Synchronizer module 322, depth map engine 324, and 2.5 dimensional image generator 326 may each represent a computer program that executes by processing device 330 causes the processor to perform a series of operations. In a different embodiment, synchronizer module 322, depth map engine 324, and 2.5 dimensional image generator 326 may represent standalone hardware.

Image processing device 305 may represent one or more image processing servers, or a standalone device for creating a 2.5-dimensional image from a 360-degree view from at least two 360-degree cameras. For example, by combining the images from two 360-degree cameras (i.e., camera 310 and 315), the resulting image provides an element of depth from a single point of view for a user to view. The depth provided in a 2.5-dimensional image is similar to a 3 dimensional (3-D) image without being "true 3-D." Further, image processing device 305 may further manipulate the image such that the resulting image changes slightly in response to a detected movement from a user. For example, as the user views the image occluded portions may become visible as the display is moved to a different perspective.

Image processing device 305 acquires image data from external cameras 310 and 315. In other embodiments, cameras 310 and 315 may be included as an internal component of image processing device 305.

As depicted in system 300, image data from camera 310 and camera 315 are acquired camera image data 328. The image data may be later synchronized by synchronizer module 322. If the image data is internally synchronized, synchronizer module 322 may synchronize the two or more 360-degree images to ensure the images are captured at the same time. In other embodiments, image data from camera 310 and camera 315 are acquired directly by synchronizer module 322. In an alternative embodiment, image data from cameras 310 and 315 are synchronized external to image processing device 305. Therefore, if the image data is externally synchronized, then the image data may be acquired by either camera image data 328 and/or by depth map engine 324, for further processing. For example, the synchronization may occur external to image processing device 305 if the shutters for each of camera 310 and camera 315 are mechanically and/or electrically synced Synchronizer module 322 synchronizes the two sets of image data captured by the 360-degree cameras, camera 310 and camera 315. It is noted that more than two cameras may be utilized in capturing a scene, and therefore synchronizer module would then synchronize each set of image data, to a single time frame. In an embodiment, synchronizer module 322 may synchronize the received images by matching the time stamps of each image taken by each of the 360-degree cameras. In other embodiments, synchronization may occur by utilizing image mapping technique by mapping each of the images to each other. For example, positional information derived in each image may be utilized to match each image to each other which syncs the images together for a given time.

In an embodiment of the present disclosure, synchronizer module 322 may extract a time stamp associated with each set of image data from each camera (camera 310 and camera 315). Synchronizer module 322 then synchronizes the two sets of image data based on the time stamp from the two sets of images so the images align to a single point in time. If the image data is a video, synchronizer module 322 aligns the images to a singular and unified time frame.

In an embodiment, synchronizer module 322 may synchronize the received data based on image mapping. For example, synchronizer module 322 may synchronize the images by aligning images from camera 310 with images from camera 315, in order match the image in a particular time frame. Aligning the image may be based on the image as a whole, sections of an image, or each individual or grouping of pixels.

Embodiments of the present disclosure recognize and take into account that images received from camera 310 and images received from camera 315 may be taken at different resolution or sizes. Therefore, synchronizer module 322 may adjust the size (both physical x, y coordinate and resolution) of one or more images in order to generate similar size images.

Depth map engine 324 generates a depth map from each pixel or subset of pixels for each received synchronized image. Generally, a depth map image is an image that contains information relating to the surface(s) of scene objects from a single view point. For example, each pixel or group of pixels within each 360-degree image is assigned a variable which is its extracted distance from the respective camera. The variable may be represented as a numerical value and/or an assigned color. For instance, a depth map shows luminance in proportion to the distance from the camera (i.e., nearer surfaces are darker and further surfaces are lighter; alternatively, nearer surfaces are lighter and further surfaces are darker). In generating a depth map, depth map engine 324 may convert each pixel (or subset of pixels) from a received image to be represented by a 256-color greyscale, of which each pixel is depicted as a distance from the camera. Depth map engine 324 may estimate the distance between the target object (similar to object 220) and the capturing device (i.e., camera 310 and camera 315) to create a stereo depth map.

The generation of a depth map may encompass determining the distance of points in a scene from the recording source. For example, depth map engine 324 generates a depth map by deriving the distance the same object is from both camera 310 and camera 315. The object may be segmented down to singular pixels or a subset of pixels. Segmentation is performed for the entire 360-degree image. Depth map engine 324 then compares the distance the object is from each respective camera, in order to generate the depth map. For example, an object recorded by camera 310 will have computational distance, different that the same object as recorded by camera 315. In an embodiment, the images are synchronized as depth map engine 324 compares the distance of the objects in each set of image data as received from each camera 310 and 315. If an object is moving, the object as perceived by both cameras should be recorded at the same time (i.e., based on an identical time stamp), otherwise the object may not be in the same position when depth map engine calculates and generates the depth map of the scene. For instance, when an object is moving in the scene, cameras 310 and 315 are synchronized such that the object is fixed at a specific time when the images are recorded.

Depth map engine 324 may record for each pixel or subset of pixels the distance found relative to the center point of one of the cameras. For example, depth map engine 324 may determine the distance of each pixel or subset of pixels in the scene. Depth map engine 324 may, for each determined distance, record the distance found relative to one of the cameras' center points. The depth map may be generated relative to the distance of one of the cameras.

Depth map engine 324 may match each pixel or subset of pixels in an image. For each point the corresponding depth value is derived. The depth value from each image may then be compared to generate a resultant image which represents the distance between each object and each respective camera. Thereby, the distance of each point (i.e., a pixel or subset of pixels) is derived. Based on the derived distance, depth map engine 324 may then record the distance relative to one of the cameras. Further details are discussed with reference to FIG. 4B below.

Depth map engine 324 may utilize a plurality of techniques in generating a depth map from the synchronized input of the 360-degree image. Exemplary techniques include, but are not limited to optical flow, weight-based windows, graph cuts, Markov Random Field, visual cues, image segmentation, or motion cues and the like.

Depth map engine 324 may then store the depth value for each point (i.e., pixel of subset of pixels) of the image. In an embodiment, each point may be associated with depth and location information as well as a time stamp and any necessary metadata.

The 2.5-dimensional image generator 326 (image generator) generates a 2.5-dimensional image based on the synchronized images from cameras 310 and 315 coupled with the depth map. Image generator 326 generates a 2.5-dimensional image from one of the received 360-degree images by adding depth to the image. For example, image generator 326 can apply the generated depth map to one of the received images to create a 2.5-dimensional image. Since both the received image and the depth image are based on a 360-degree view, the resulting 2.5-dimensional image will also be a 360-degree view of the scene. Although a 2.5-dimensional image may not be true stereo, the created 2.5-dimensional image 360-degree image gives a sense of depth to an otherwise flat image.

Image generator 326 can apply the depth map to any of the received camera images. For example, utilizing a similar set up as in FIG. 2, image generator 326 can apply the depth map to the image received from the top camera (camera 210 of FIG. 2). By applying the generated depth map to the received image from the top camera (camera 210), in lieu of the bottom camera (camera 215), image generator 326 avoids the possibility that a portion of the image from the bottom camera is occluded by the top camera.

Image generator 326 may utilize a plurality of techniques in creating a 2.5-directional image by applying the depth map to one of the received 360-degree images. Exemplary techniques include, but are not limited to include scale, drop shadows, transparency, z-buffering, z-culling, or depth cueing, and the like.

In an embodiment, image generator 326 may supplement one of the 360-degree images with the greyscale depth map. By applying the generated depth map to an image, image generator 326 indicates if a specified pixel in the 3-dimensional image is to be displayed in front of the image or behind the image. For example, if the depth map is based on a 256-greyscale, the greyscales can build a smooth gradient of depth within the image.

In an embodiment image generator 326 may perform further enhancements to the generated 2.5-dimensional 360-degree image. For example, objects closer to the viewer may appear brighter and/or slightly larger, whereas objects further from the user may appear duller, fuzzier and/or smaller. Therefore, when a user viewing the image on display 355, upon the user slightly moving their head in translation have the movement reflected in the scene. Similarly, when a user is viewing the image in stereo on display 355, objects closer to the viewer may move to the left in the left eye and move to the right in the right eye. The amount of movement of the objects for the right eye and the left eye would be similar. Thereby based on these embodiments, when a user views the image objects in the background which are occluded by objects in the foreground, may become visible or at least a portion of the background object may become more visible.

In an embodiment, display 355 may be a stereoscopic display. In an embodiment, display 355 may be similar to display 155 of FIG. 1. Display 355 may be similar to a display screen on mobile device, a display screen on a computer or tablet, a head mounted display, an augmented reality (AR) Headset, a virtual reality (VR) headset display, and the like.

Reference is now made to FIGS. 4A, 4B, and 4C. FIGS. 4A, 4B, and 4C illustrate an example horizontal configuration of two 360-degree cameras in accordance with an embodiment of this disclosure. The embodiments of the horizontal configurations illustrated in FIGS. 4A, 4B, and 4C are for illustration only, the horizontal configurations may come in a wide variety of configurations, and FIGS. 4A, 4B, and 4C do not limit the scope of this disclosure to any implementation of a horizontal configuration.

FIGS. 4A, 4B, and 4C depict a 360-degree scenery 405 which is captured and recorded by camera 410 and camera 415 (similar to electronic device 100 of FIG. 1, camera 210 and 215 of FIG. 2 and/or cameras 310 and 315 of FIG. 3) and a object 420 (for example a wall or other longer object/obstruction). FIG. 4C also depicts another object 425. Cameras 410 and 415 can be interconnected over a network, or may be standalone devices.

Camera 410 and camera 415 are 360-degree cameras that captured an image of scenery 405. Camera 410 and camera 415 also captured the image of an object 420. FIGS. 4A, 4B, and 4C depict an overhead view of a camera 410 and camera 415, with the cameras positioned along a horizontal axis a known distance apart. Camera 410 and camera 415 capture scenery 405 in stereo vision and mono vision. Scenery 405 represents the view that cameras 410 and 415 can record. In an embodiment, the boundary of scenery 405 may by infinite and/or extent to the horizon. For example, the boundary of scenery 405 may by finite as objects (not shown) occlude any further image. The boundary of scenery 405 may not be a perfect oval as depicted, but rather could take any shape dependent on the object(s) being captured and recorded by cameras 410 and 415. In different embodiments, any number of cameras may record content of the scenery 405, however only two cameras are illustrated for exemplary purposes. Once the image is captured, an electronic device similar to image processing device 305 of FIG. 3 may create a 2.5-dimensional view of scenery 405.

Scenery 405 is made up of two distinct portions, stereo area 430 and mono area 440. Stereo area 430 represents stereo vision as camera 410 and camera 415 as both cameras may appreciate and record an image of the same area. A 2.5-dimensional image may be created based on the area of stereo area 430 due to the stereo vision. Line 445 depicts an exemplary boundary line that separates stereo area 430 and mono area 440. Mono area 440 represents an area of scenery 405 of which only one camera can record and capture objects within, as mono area 440 is only viewed by one camera thus given the name mono. In contrast, stereo area 430 can be viewed by two cameras, thus called stereo. For example, when camera 410 attempts to capture an image to the right, camera 415 occludes the point of view of camera 410. Similarly, when camera 415 attempts to capture an image to the left, camera 410 occludes the point of view of camera 415. Therefore, mono area 440 is limited as only one camera can capture the image.

In an example embodiment, when processing the image, a depth map may be created from the stereo area 430 as that portion of scenery 405 is in stereo vision. Image data received from cameras 410 and 415 is utilized to generate the depth map from the recorded view of stereo area 430. A depth map cannot be directly generated from any portion of scenery 405 which falls within the mono area 440. Mono area 440 is limited as it depicts an area of scenery 405 of which only one camera is capable to perceive objects within.

Since objects within the mono area 440 are not viewed in stereo, no depth is directly associated with that portion of the recorded image. For example, depth map engine 324 of FIG. 3 cannot directly generate a depth map of mono area 440, as it cannot derive the distance an object is from camera 410 and compare that to the distance the same object is from camera 415.

In this example, a depth map can be indirectly generated from the image captured in the mono area 440. As illustrated in FIG. 4A, object 420 passes through both the stereo area 430 and the mono area 440. Camera 410 can view the entirety of object 420 (portion 450 and portion 455). In contrast, camera 415 can only view portion 450 of the object 420, as portion 455 is occluded by camera 410. Portion 450 of object 420 may have a calculated depth associated with each portion of located in the stereo area 430. For example, each portion of object 420 is a determinable distance from camera 410. Similarly, each portion of object 420 (within the stereo area 430) is a determinable distance from camera 415. Since object 420 is closer to camera 410 than camera 415, a depth image may be generated for portion 450. As depicted in FIGS. 4A, 4B, and 4C object 420 is linear. Therefore, depth map engine 324 may infer and approximate the distance of portion 455. Thereby depth map engine 324 may approximate the depth of object 420 along portion 455, based on portion 450 of the object 420 in the stereo area 430. In an embodiment, if object 420 is not linear, depth map engine 324 may still derive the approximate depth of object 420 along portion 455, based on a distance of object 420 is from camera 410.

FIG. 4B illustrates the lines of sight 460 and 465 from cameras 410 and 415, respectively. It is appreciated that line of sight 460 is a shorter distance than line of sight 465, as camera 410 is closer to object 420 than camera 415. In an embodiment, depth map engine 324 may generate a depth map relative to one of the cameras center point. For example, the depth map may be relative to the center point of camera 415 (of which the line of sight 465 extends). In an embodiment, depth map engine 324 can generate a depth map based on deriving the distance along the perspective line of sight 460 is from camera 410 and object 420 and similarly, the distance along the perspective line of sight 465 is from camera 415 and object 420. Depth map engine 324 may then compare the distance of each line of sight 460 and 465 to generate a depth map. Since depth map engine 324 knows the distance between cameras 410 and 415, it can generate a depth map depicting the perceived distance that object 420 is from each camera respectively. In an embodiment, depth map engine determines the distance of each pixel (or subset of pixels) relative to the center point of one of the cameras (cameras 310 or camera 315). The perceived distance determined by the depth map may then be utilized to create the 2.5-dimensional image.

FIG. 4C is similar to FIGS. 4A and 4B, with the inclusion of an object 425. Object 425 is a 3 dimensional object viewable only by camera 410 as camera 415 is occluded by 410. Object 425 is solely within the mono area 440. Therefore, object 425 is not viewed in stereo vision from both cameras 410 and 415. Therefore, depth map engine 324 may approximate the size of object 425, in comparison to object 420. For example, depth map engine 324 can determine the distance that object 420 is from camera 410. Since camera 410 views both object 420 and object 425. Depth map engine 324 can then infer that object 425 is in front of object 420. Since object 425 is closer to camera 410 than object 420 is to camera, depth map engine 324 may infer the approximate size of object. Depth map engine 324 may additionally and/or alternatively utilize artificial intelligence (AI) and/or computer vision (CV) to further refine the approximate size of object 425. Upon determining the approximate size, of object 425, a depth map may be created, regardless of one or more objects present in the mono area 440. A similar approach may be performed for an object located between the two cameras (not shown).

Embodiments of the present disclosure recognize that depth map engine 324 may also utilize CV to identify object 425. For example, CV may include various approaches to analyze, and acquire an understanding of data from the received images in order to extract useful information from the images. For example, CV may include object recognition which may identify object 425. Object recognition may include one or more pre-specified or learned objects or object classes. Exemplary techniques of object recognition may include, but are not limited to edge matching, divide and conquer search, grayscale matching, gradient matching, histograms, geometric hashing, interpretation trees, and the like. Additionally, CV may determine specific portions of object 425 that may be relevant for further processing, such as one or more angles, a region of interest and the like. Upon identifying object 425, depth map engine 324 may derive an approximate size of object 425. Upon determining the approximate size of object 425, a depth map may be created, regardless of one or more objects present in the mono area 440.

In various embodiments, depth map engine 324 may also utilize AI to identify object 425. AI perceives the environment of the image and takes various actions that maximize its chance of success at identifying the object at issue, i.e., object 425. AI may include machine learning and various cognitive analysis approaches to derive the size and/or what object 425 is. Upon identify object 425, depth map engine 324 may derive an approximate size of object 425. Upon determining the approximate size, of object 425, a depth map may be created, regardless of one or more objects present in the mono area 440.

In an embodiment, object 425 may be in between camera 410 and camera 415, solely within mono area 440 (not shown). Depth map engine 324 may compare the shadow outline of object 425 between camera 410 and camera 415 to determine which shadow outline is bigger. Based on which shadow outline is bigger, depth map engine 324 can derive that object 425 is closer to that respective camera. For example, if shadow outline of object 425 is 1.2 times larger on camera 410 than camera 415, depth map engine 324 derives that object 425 is 20% closer to camera 410 than camera 415. Since the distance between camera 410 and camera 415 is known, depth map engine 324 can generate an approximate size of object 425.

In an embodiment, often object 425 may not solely by in the mono area 440. For example, if object 425 is in both stereo area 430 and mono area 440 (similar to object 420) then a portion of object 425 will be recorded stereo and therefore a portion of object 425 will have a known depth associated therewith. Therefore, depth map engine 324 may approximate the depth of the remainder of object 425.

Figure 5:
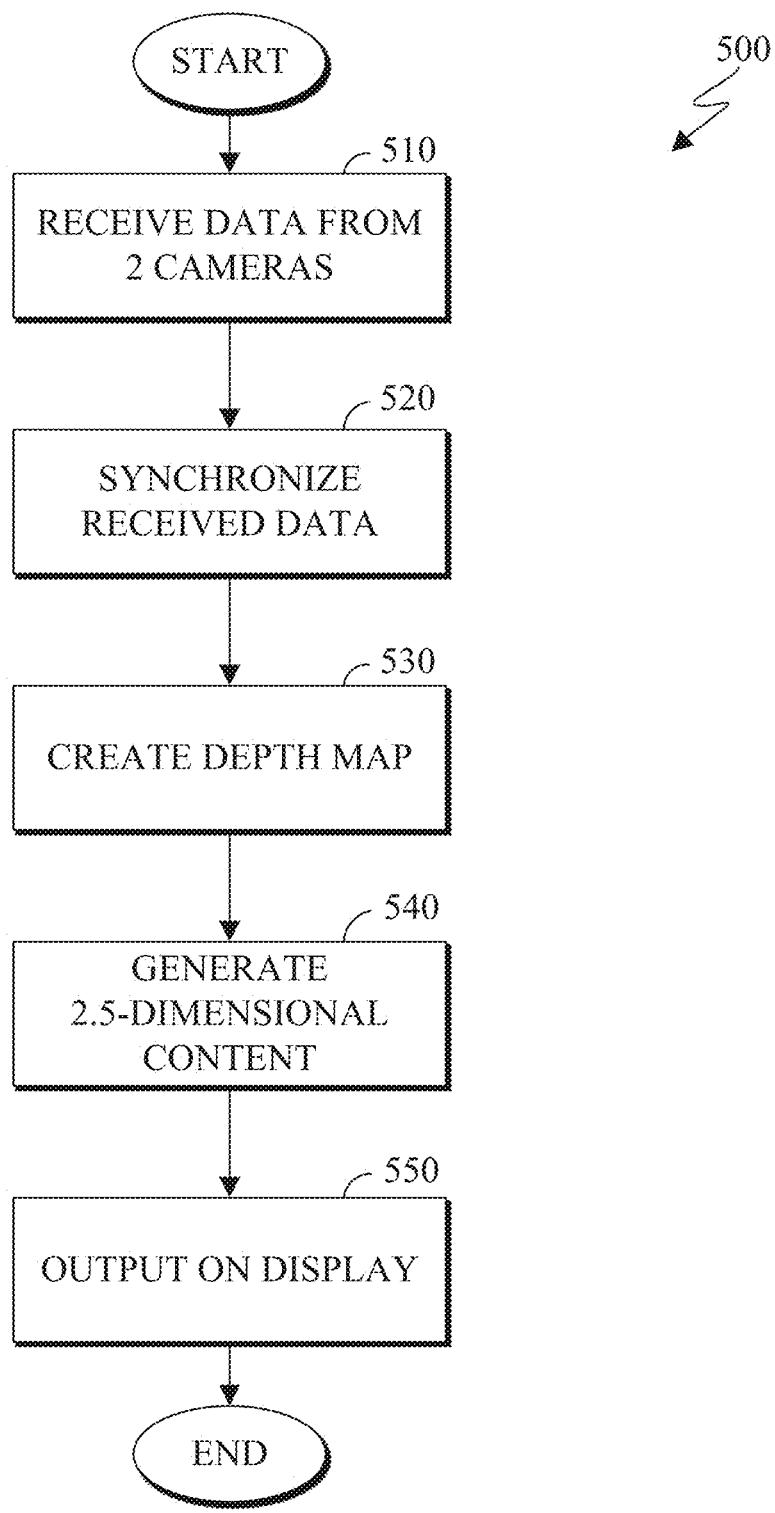
FIG. 5 illustrates an example flow chart in accordance with an embodiment of this disclosure.

FIG. 5 illustrates an example flow chart in accordance with an embodiment of this disclosure. Process 500 depicted in FIG. 5 may be performed by the image processing device 305 of FIG. 3.

At operation 510 the process beings with image processing device 305 receiving image data from at least two cameras. In an embodiment the image processing device 305 receives content (image and/or video data) from the at least two 360-degree cameras.

At operation 520 the image processing device 305 synchronizes the received data. The synchronization may be performed based on a time stamp of each set of received data, one or more image mapping techniques, and/or externally such as by the cameras that captured the content. It is noted that synchronization may still be required for video images, or still images that an object is moving through.

At operation 530, the image processing device 305 generates a depth map based on the synchronized received data (360-degree image or 360-degree video). In different embodiments, the depth map is created from the synchronized input, by deriving the distance between each pixel of the synchronized content. In an embodiment, the depth map is based on deriving the distance between the camera and each pixel or subset of pixels within each 360-degree image/video and then comparing the derived distance between the received images and/or video. The depth map is relative to one of the cameras center points. For example, the depth map is based on the relative distance from one cameras center point.

At operation 540 the image processing device 305 creates the 2.5-dimensional image/video. The 2.5-dimensional content of the 360-degree scene is based on the created depth map and the received data from one of the 360-degree cameras. For example, the depth map may be applied to the content recorded by the top camera of FIG. 2 (camera 210). In another example, the depth map may be applied to the content recorded by the left camera of FIG. 4A (camera 410).

Applying the depth map to the received content provides a level of depth to the 360-degree content. For example, the depth map is based on the distance each object is perceived between the two or more cameras. When the depth map is applied to one of the received 360-degree scenes, a level of depth is imputed into the image or video relative to the distance between two cameras. An exemplary distance may be similar to the IPD.

At operation 550, the image processing device 305 may output the 2.5-dimensional content to a display (e.g., a stereoscopic display, a standard display, etc.). When a user views the image on a display, the 360-degree scene will have a sense of depth and realness. In an embodiment, the image may include additional enhancements which create slight adjustments to the image based on a slight head tilt from a user and/or additional enhancements which alter objects in the image depending on their location to the camera. For example, objects which are closer may be slightly enlarged and/or perceivably brighter than objects further away. Similarly, objects which are further away may be slightly truncated, and/or perceivably duller/fuzzier than objects closer to the viewer. Such enhancements may be generated in operation 540 or generated in another operation not shown in process 500.

Although FIG. 5 illustrates an exemplary flowchart, various changes could be made to FIG. 5. For example, while shown as a series of steps, various operations in each figure could overlap, occur in parallel, occur in a different order, or occur multiple times. For example, operation 510 and operation 520 may be a singular operation. Additionally, in one embodiment, operation 520 may not be part of process 500. For example, operation 520 may be omitted it nothing in the image is moving. Additionally, in one embodiment, operation 550 may not be part of process 500.

Figure 6:
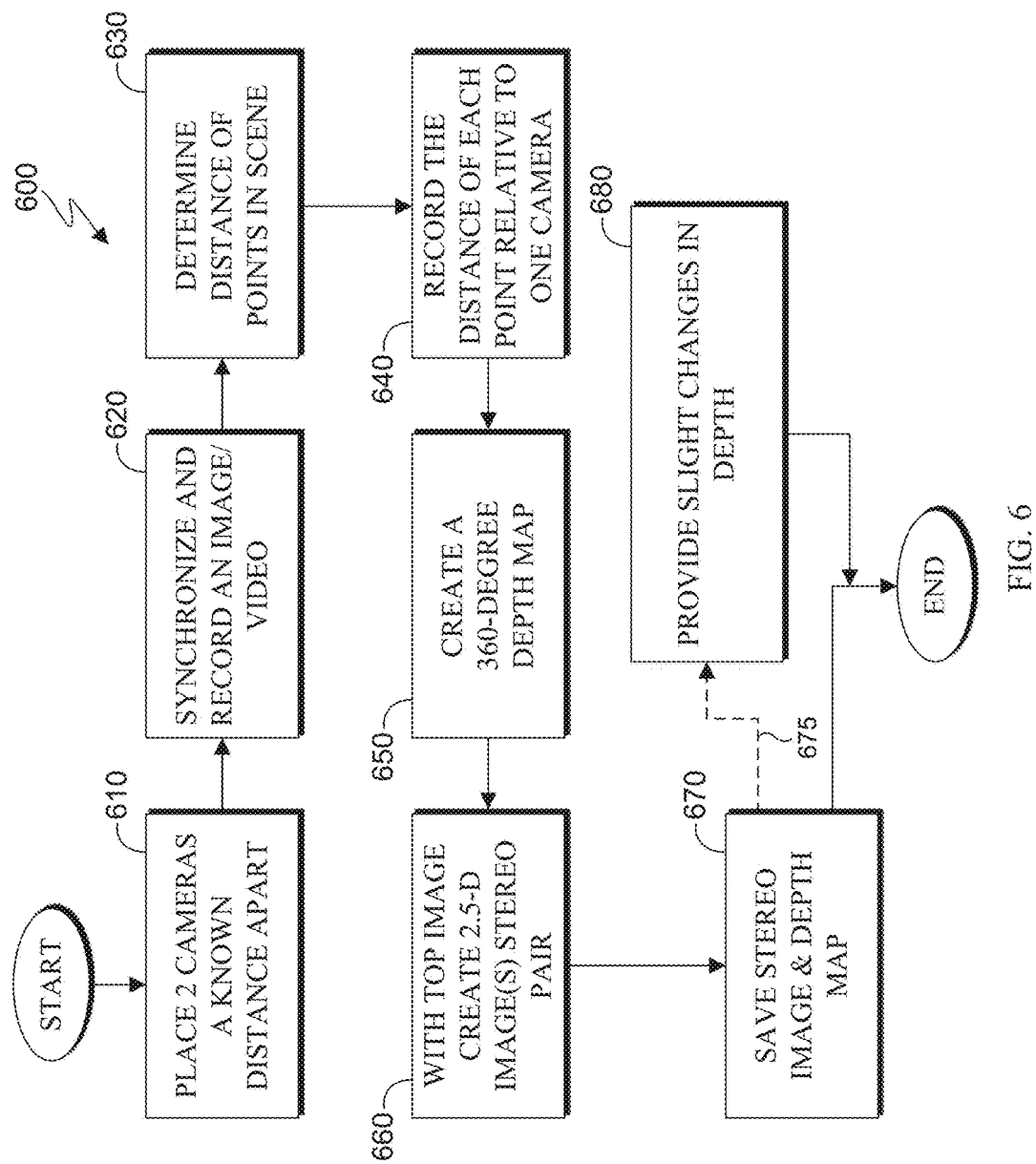
FIG. 6 illustrates an exemplary flow chart in accordance with an embodiment of this disclosure.

FIG. 6 illustrates an exemplary flowchart in accordance with an embodiment of this disclosure. Process 600 depicted in FIG. 6 may be performed by the image processing device 305 of FIG. 3.

Process 600 provides an exemplary process to create a 2.5-dimensional image/video of a 360-degree view. At operation 610 two 360-degree cameras are placed a known distance apart. The distance between the two cameras is measured between the center points of each camera. In different embodiments, any number of 360-degree cameras may be used to create the 2.5-dimensional content. The cameras may be placed on top of one another or in any position where the positional relationship between the cameras is known.

At operation 620 image processing device 305 synchronizes and records the content from each camera. In an embodiment the synchronization may occur prior to recording the content. The synchronization may occur after recording the content. In an embodiment synchronization may be based on an external mechanical or electrical device. For example, synchronization may be based off a remote control providing an indication to record content. The synchronization may be based off a mechanical device simultaneously providing the input to record content.

At operation 630, the image processing device 305 determines the distance of points in the scene. In an embodiment, the determination occurs after the images/videos are synced. In an embodiment, the determination occurs with both images. At operation 640, the image processing device 305 records the distance found relative to the one of the cameras center point. For example, once the distance of each pixel or subset of pixels (point) in the scene are determined, for each point the process records the distance found relative to one cameras center point. The recorded distance is relative to the camera 210 of FIG. 2. At operation 650 the image processing device 305 creates a depth map from the recorded points. The depth map is relative to one camera and of the 360-degree scene.

At operation 660 the image processing device 305 creates the 2.5-dimensional stereo from the image/video of the 360-degree view recorded in operation 620. In an embodiment the 2.5-dimensional content is created by applying the depth map to the top image. If the distance is recorded relative to a camera per operation 640, then in operation 660 image processing device 305 creates the 2.5-dimensional content using the depth map and the image/video from the same camera. For example, referencing the camera 210 of FIG. 2, if the distance is recorded relative to the camera 210 per operation 640, then in operation 660 the 2.5-dimensional content is created using the depth map and the image/video from camera 210. The result will create a 2.5 dimensional image/video stereo pair. In operation 670 the created stereo image and depth map are saved to a memory.

Operation 680 is optional as indicated by dashed line 675. If supported by the viewer, in operation 680, slight changes in depth may be generated. The perceived slight changes in depth may be based on the viewer's depth displacement. For example, objects closer to the viewer may be larger and brighter, whereas objects further from viewer may be smaller, duller and slightly blurry.

Slight changes in depth may allow for slight movements of objects within the 360-degree scene. For example, the 2.5-dimensional content provides a single point of view, but due to the recorded content the two or more cameras, which provide slightly different views of the same scene, the view may shift slightly.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
   receiving, from each of two 360-degree cameras, image data;
   synchronizing the image data from each of the two 360-degree cameras based on a time when the image data from each of the two 360-degree cameras is captured;
   creating a depth map from the synchronized image data based in part on a distance between the two 360-degree cameras; and
   generating multi-dimensional content by combining the created depth map to the synchronized image data of at least one of the two 360-degree cameras.

2. The method of claim 1, further comprising:
   matching pixels, between the synchronized image data from each of the 360-degree cameras;
   deriving a comparative distance between each of the matched pixels; and
   generating the depth map based on the comparative distance.

3. The method of claim 1, wherein generating the multi-dimensional content comprises simulating three dimensional content of a 360-degree scene based on a perspective of one of the 360-degree cameras.

4. The method of claim 1, wherein the two 360-degree cameras are positioned in a vertical alignment with a first 360 degree camera above a second 360-degree camera.

5. The method of claim 1, wherein when the two 360-degree cameras are positioned adjacent each other, the method further comprising:
   in response to deriving an object is occluded by one of the 360-degree cameras, determining a size of the object based on a second distance that the object is from a second object within a stereo view of the two 360-degree cameras.

6. The method of claim 1, wherein when the two 360-degree cameras are positioned adjacent each other, the method further comprising:
   in response to deriving an object is in between the two 360-degree cameras, determining a size of the object based on a second distance that the object is from each of the 360-degree cameras.

7. The method of claim 1, further comprising,
   determining a size of an objects by identifying the object based on object recognition.

8. An electronic device comprising:
   a communication interface,
   at least one processor coupled to the communication interface, the at least one processor configured to:
      receive from each of two 360-degree cameras, image data;
      synchronize the image data from each of the two 360-degree cameras based on a time when the image data from each of the two 360-degree cameras is captured;
      create a depth map from the synchronized image data based in part on a distance between the two 360-degree cameras; and
      generate multi-dimensional content by combining the created depth map with the synchronized image data of at least one of the two 360-degree cameras.

9. The electronic device of claim 8, wherein the at least one processor is further configured to:
   match pixels, between the synchronized image data from each of the 360-degree cameras;
   derive a comparative distance between each of the matched pixels; and
   generate the depth map based on the comparative distance.

10. The electronic device of claim 8, wherein to generate the multi-dimensional content, the at least one processor is further configured to: simulate three dimensional content of a 360-degree scene based on a perspective of one of the 360-degree cameras.

11. The electronic device of claim 8, wherein the two 360-degree cameras are positioned in a vertically alignment with a first 360-degree camera above a second 360-degree camera.

12. The electronic device of claim 8, wherein:
   the two 360-degree cameras are positioned adjacent each other, and
   the at least one processor is further configured to determine a size of an object based on a second distance the object is from a second object within a stereo view of the two 360-degree cameras, in response to deriving the object is occluded by one of the 360-degree cameras.

13. The electronic device of claim 8, wherein:
   the two 360-degree cameras are positioned adjacent each other, and
   the at least one processor is further configured to determine a size of an object based on a second distance the object is from each of the 360-degree cameras, in response to deriving the object is in between the two 360-degree cameras.

14. The electronic device of claim 8, wherein the at least one processor is further configured to determine a size of an objects by identifying the object based on object recognition.

15. A non-transitory computer readable medium comprising program code that, when executed by at least one processor, causes the at least one processor to:
   receive from each of two 360-degree cameras, image data;
   synchronize the image data from each of the two 360-degree cameras based on a time when the image data from each of the two 360-degree cameras is captured;
   create a depth map from the synchronized image data based in part on a distance between the two 360-degree cameras; and generate multi-dimensional content by combining the created depth map with the synchronized image data of at least one of the 360-degree two cameras.

16. The non-transitory computer readable medium of claim 15, further comprising program code that, when executed by the at least one processor, causes the at least one processor to:

match pixels, between the synchronized image data from each of the 360-degree cameras;

derive a comparative distance between each of the matched pixels; and generate the depth map based on the comparative distance.

17. The non-transitory computer readable medium of claim 15, wherein to generate the multi-dimensional content, further comprises program code that, when executed by the at least one processor, causes the at least one processor to simulate three dimensional content of a 360-degree scene based on a perspective of one of the 360-degree cameras.

18. The non-transitory computer readable medium of claim 15, wherein the two 360-degree cameras are positioned adjacent each other, and further comprising program code that, when executed by the at least one processor, causes the at least one processor to determine a size of an object based on a second distance the object is from a second object within a stereo view of the two 360-degree cameras, in response to deriving the object is occluded by one of the 360-degree cameras.

19. The non-transitory computer readable medium of claim 15, wherein the two 360-degree cameras are positioned adjacent each other, and further comprising program code that, when executed by the at least one processor, causes the at least one processor to determine a size of an object based on a second distance the object is from each of the 360-degree cameras, in response to deriving the object is in between the two 360-degree cameras.

20. The non-transitory computer readable medium of claim 15, further comprising program code that, when executed by the at least one processor, causes the at least one processor to determine a size of an objects by identifying the object based on object recognition.

* * * * *